(12) United States Patent
Nesland, Sr.

(10) Patent No.: US 7,371,321 B1
(45) Date of Patent: May 13, 2008

(54) FLUID FILTRATION SYSTEM

(76) Inventor: Nickolas Bernheart Nesland, Sr., 4824 Old Stump Dr. NW., Gig Harbor, WA (US) 98332

( * ) Notice: Subject to any disclaimer, the term of this patent is extended or adjusted under 35 U.S.C. 154(b) by 319 days.

(21) Appl. No.: 10/336,281

(22) Filed: Jan. 2, 2003

Related U.S. Application Data

(60) Provisional application No. 60/347,210, filed on Jan. 8, 2002.

(51) Int. Cl.
*B01D 35/30* (2006.01)

(52) U.S. Cl. .................. 210/248; 210/387; 210/440; 210/443; 210/450; 210/497.1

(58) Field of Classification Search ............. 210/443, 210/440, 455, 493.1, 441, 387, 445, 439, 210/438, 453, 456, 497.1, 232, 234, 248, 210/423, 444
See application file for complete search history.

(56) References Cited

U.S. PATENT DOCUMENTS

| | | | | |
|---|---|---|---|---|
| 1,630,287 | A | | 5/1927 | Amdursky |
| 2,349,174 | A | * | 5/1944 | Klinkhamer ................ 210/438 |
| 2,406,308 | A | * | 8/1946 | Stokes et al. ............... 210/131 |
| 2,471,069 | A | * | 5/1949 | Le Clair ..................... 210/423 |
| 3,132,097 | A | * | 5/1964 | Tietz ........................... 210/130 |
| 3,308,956 | A | * | 3/1967 | Yee et al. ................... 210/232 |
| 3,388,800 | A | | 6/1968 | MacGregor |
| 3,557,958 | A | | 1/1971 | Baldwin |
| 3,615,018 | A | | 10/1971 | Johnson |
| 3,923,663 | A | | 12/1975 | Reid |
| 4,017,400 | A | * | 4/1977 | Schade ....................... 210/439 |
| 4,349,438 | A | * | 9/1982 | Sims .......................... 210/180 |
| 4,452,695 | A | | 6/1984 | Schmidt |
| 4,853,120 | A | | 8/1989 | Frantz |
| 5,039,406 | A | | 8/1991 | Whittington |
| 5,279,732 | A | | 1/1994 | Edens |
| 5,362,390 | A | * | 11/1994 | Widenhoefer et al. ...... 210/235 |
| 6,319,415 | B1 | * | 11/2001 | Schade ....................... 210/767 |

* cited by examiner

*Primary Examiner*—Joseph Drodge
(74) *Attorney, Agent, or Firm*—Christensen O'Connor Johnson Kindness PLLC

(57) ABSTRACT

A filtration system (10) for removing contaminants from a fluid is provided. The system includes a housing (44) having a convex shaped base (78) and a top (84), with filter media (46) disposed within the housing. The filter media may take the form of a roll having a first end formed by edges of the wound filter media and convex in shape. The system may further include a seal (56) adapted to impede channeling of the fluid in proximity to the core through substantially sealing annuluses formed between adjacent wraps of filter media by engaging the edges of the filter media in proximity to the core without substantially radially displacing the filter media. A fluid passageway may pass through the housing, wherein the passageway (20, 24, 40, and/or 42) is sized sufficiently small in cross-sectional area to substantially impede the flow of fluid through the passageway due to gravity.

52 Claims, 3 Drawing Sheets

FLUID FILTRATION SYSTEM

CROSS-REFERENCE TO RELATED APPLICATION

This application claims the benefit of U.S. Patent Application No. 60/347,210, filed Jan. 8, 2002, priority from the filing date of which is hereby claimed under 35 U.S.C. § 120 and the disclosure of which is hereby expressly incorporated by reference.

FIELD OF THE INVENTION

The present invention relates generally to fluid filtration systems, and more particularly, to fluid filtration systems utilizing wound filtration media.

BACKGROUND OF THE INVENTION

Fluid filtration systems are commonly used in today's industrialized society to remove contaminants from a fluid. In one industry in particular, the automotive industry, fluid filtration is essential to ensuring the longevity and proper operation of internal combustion engines. More specifically, it has been found that the normal operation of an internal combustion engine results in the contamination of the lubricating oil and, consequently, increased wear/damage to the engine. Generally, contaminants are introduced into the lubricating oil by five primary sources: engine wear may introduce metal shavings; cylinder blow-by may introduce the products of combustion; water may enter from condensation or a leak in the cooling system; environmental dust may enter through the air intake system; and fuel may enter from fuel system leaks or an excessively rich intake mixture.

Typically, internal combustion engines are provided with a full flow filtration system to remove a portion of these contaminants. However, inasmuch as the full flow filtration system must handle a high rate of lubricating oil, typically in the range of 7 to 10 gallons per minute, the filter must be porous and therefore capable of removing only the larger-sized particulates, such as particulates having a size of 30 to 40 microns or larger. However, it has been found that 92% of all engine wear is the result of particulate matter sized between 7 and 40 microns, the majority of which are not removed by high-capacity full flow filtration systems.

One solution has been to provide a secondary by-pass filtration system that can remove the finer sized particulate matter. In a by-pass filtration system, a fraction of the full flow volume, such as one quart per minute for a 7- to 10-gallon flow rate system, is directed to a by-pass filter system. Typically, the by-pass filtration systems are designed to remove particles down to 1 to 6 microns. To assure maximum pressure differentials across the by-pass filter element, the return oil line is often routed directly back to the oil sump.

Another problem with existing full flow oil filtration systems is that they generally only have sufficient absorbent capacity to absorb a few teaspoons of water. Not only can water aid in the break down of the oil, limiting its lubricating properties, the water may combine with the products of combustion introduced by blow-by. Water mixed with the products of combustion may create sulfuric acid that can pit polished surfaces. In contrast, high-density by-pass filters can absorb substantially greater amounts of water, often a pint or more. When the oil heats up, the water evaporates and is released through the engine's breather conduit(s).

Commonly used by-pass filters are of one of two types. In the first type of by-pass filters, the oil passes through a perforated steel plate where all particles greater than approximately 3 microns are screened and trapped. Other by-pass filters use synthetics, paper, or polyester blends wound around a central core to create a microscopic screen to trap particles. Others use filter mediums constructed from organic materials, such as cotton or paper. While synthetics or organics will theoretically capture minute contaminants equally well, organic filtration often provides superior moisture absorption. As previously discussed, moisture mixed with soot (carbon from blow-by) forms acids. So, organic filtration may offer superior protection by trapping larger amounts of moisture in the filter so acid formation is reduced.

The operation of a typical wound filter media by-pass filter will now briefly be described. Oil at high pressure is injected at a low flow rate to a first end of the filter. The oil runs parallel with the windings between the annulus formed between the inner central core and the outer canister wall. As the lubricating oil travels from the first end to a second end of the filter, contaminants from the oil are removed. Once the oil passes the entire length of the canister, the oil is directed through a central core of the filter to return to the oil sump.

Although existing by-pass filtration systems may be effective, they are not without their problems. Often, the by-pass filters are subject to what is known in the art as channeling, where preferential paths form in the filter media. These preferential paths allow the oil to pass preferentially through the media without significant filtering. Typically, channeling is most pronounced along the inner wall of the canister and along the outer surface of the central core.

Further, changing of the by-pass filter system often results in spillage of the lubricating oil contained within the canister. Not only does the spill create a mess that must be cleaned, it also presents a slipping hazard, may harm the environment, and may lead to the violation of environmental regulations.

Still further, existing by-pass filter systems are subject to substantial pressures over a large surface area. Existing by-pass filter systems often utilize canisters having flat end shapes, which do not efficiently contain the pressure exerted on their surfaces; therefore the canister ends require more material, are heavier, and are more expensive to manufacture.

Thus, there exists a need for a by-pass filter system that reduces channeling, impedes the spillage of oil during removal, and has a canister design that efficiently contains the pressure within the canister.

SUMMARY OF THE INVENTION

In accordance with one embodiment formed in accordance with the present invention, a fluid filtration system for removing contaminants from a fluid of a machine is provided. The fluid filtration system includes a housing having a first open end and a second open end. A top is coupled to the first open end of the housing so as to close off the first open end. A base is coupled to the second open end of the housing so as to close off the second open end, wherein the base is convex in shape when viewed from within the housing. The filtration system also includes filter media disposed within the housing.

In accordance with another embodiment formed in accordance with the present invention, a filter cartridge for removing contaminants from a fluid when placed in a canister of a filter is provided. The filter cartridge includes a core disposed along a longitudinal axis of the filter cartridge. A length of filter media is wound around the core to form a roll having a cylindrical outer surface and a first end formed by successive adjacent edges of the wound filter media. The first end is convex in shape when viewed from the center of the roll.

In accordance with still another embodiment formed in accordance with the present invention, a fluid filtration system for removing contaminants from a fluid of a machine is provided. The fluid filtration system includes a housing with filter media disposed within the housing. The fluid filtration system also includes a first fluid passageway in fluid communication with the filter media and operable to be in fluid communication with the machine. At least a portion of the first fluid passageway is sized sufficiently small in cross-sectional area to substantially impede the flow of fluid due to gravity out of the housing when the fluid is at atmospheric pressure and below a selected temperature.

In accordance with an additional embodiment formed in accordance with the present invention, a fluid filtration system for removing contaminants from a fluid of a machine is provided. The fluid filtration system includes a housing and a core disposed within the housing. A length of filter media is wound around the core to form a roll having a cylindrical outer surface and a first end formed by successive adjacent edges of the wound filter media. A seal is adapted to impede channeling of the fluid in proximity to the core through substantially sealing annuluses formed between adjacent wraps of filter media. The seal engages the edges of adjacent wraps of the filter media in proximity to the core without substantially radially displacing the adjacent wraps of filter media.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
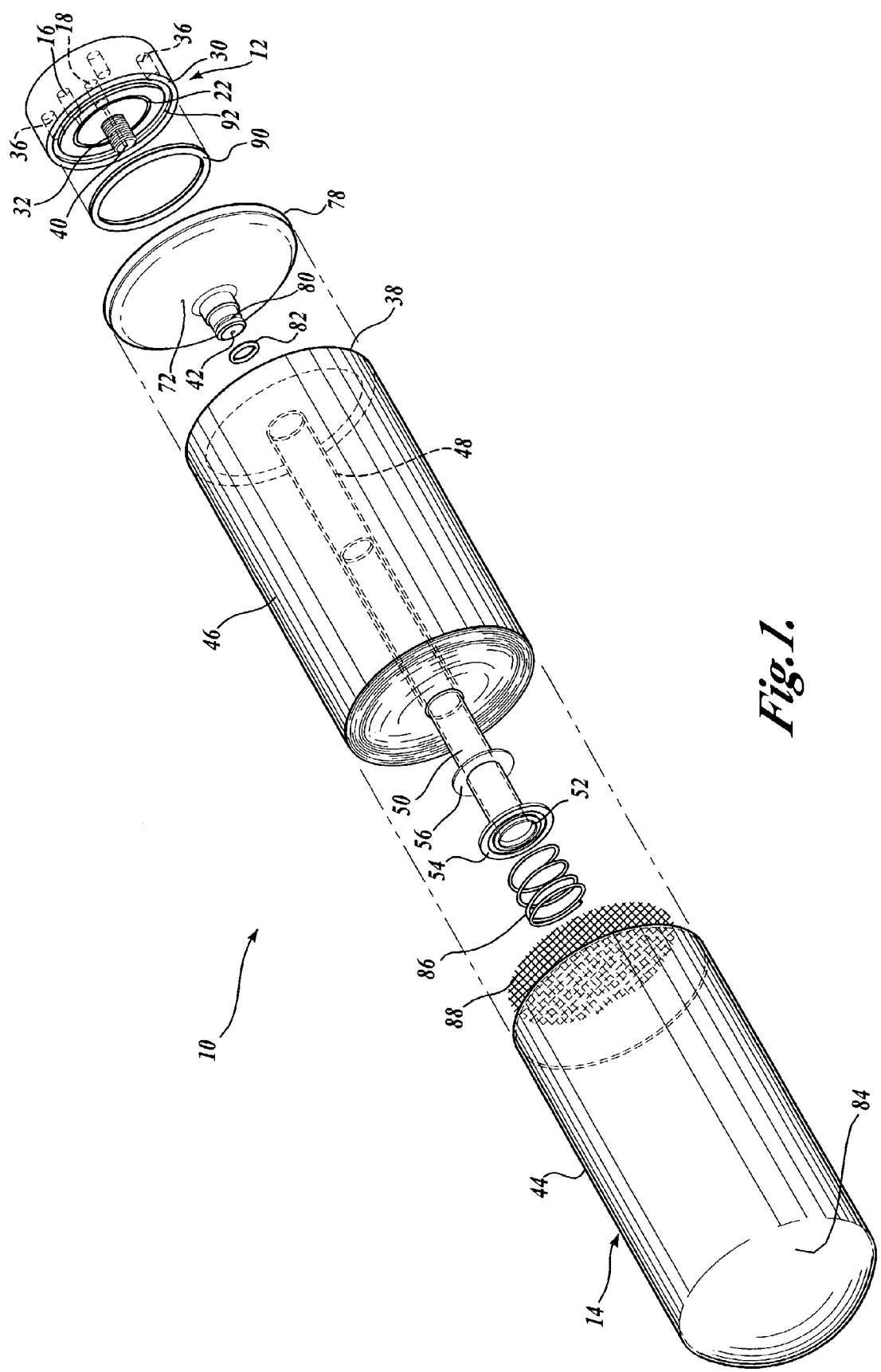
FIG. 1 is an exploded perspective view of one embodiment of a fluid filtration system formed in accordance with the present invention.
Figure 2:
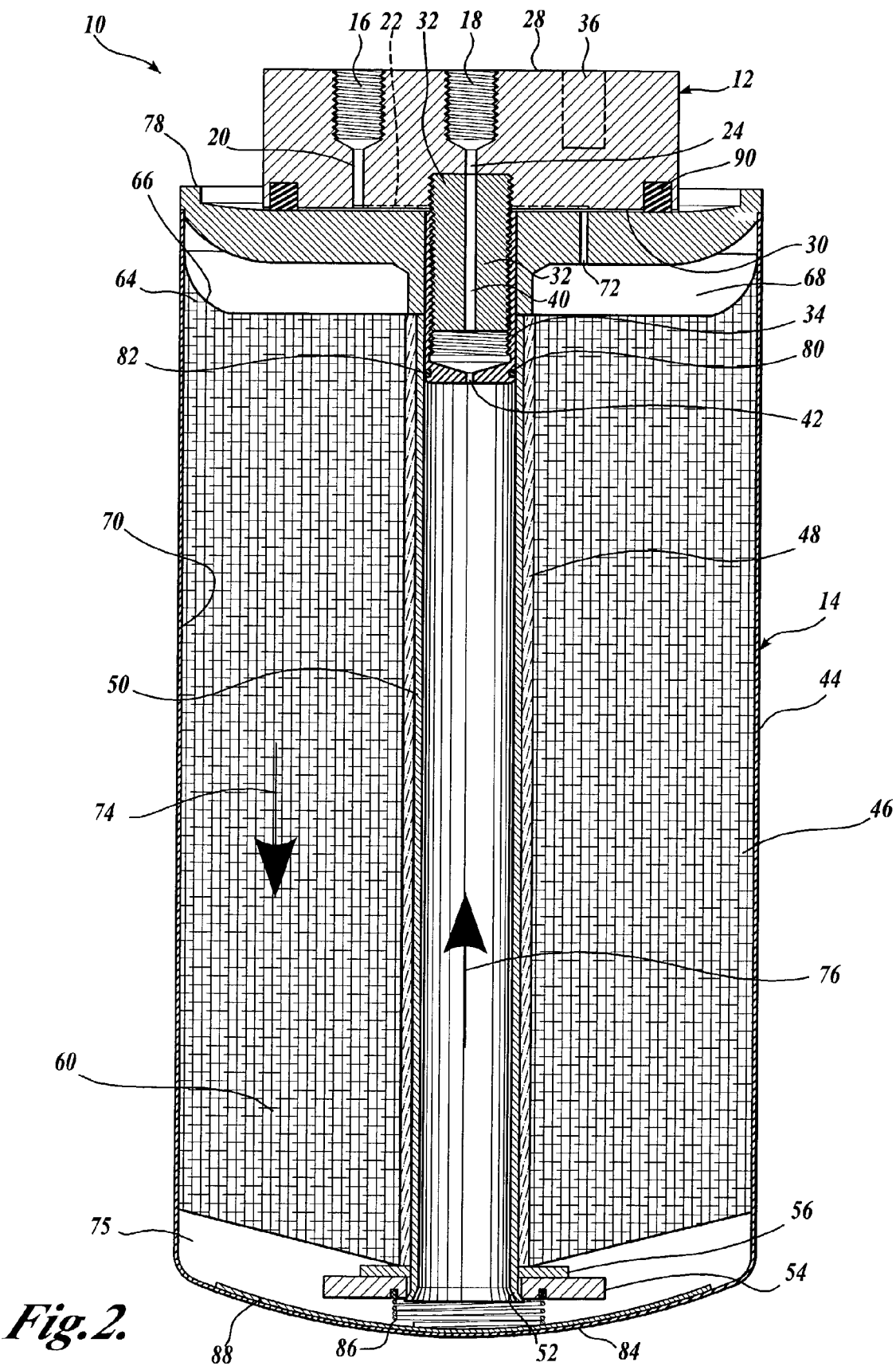
FIG. 2 is a longitudinal cross-sectional view of the fluid filtration system depicted in FIG. 1, showing the assembled elements of the fluid filtration system.

FIGS. 1 and 2 illustrate one embodiment of a fluid filtration system 10 formed in accordance with the present invention. For illustrative purposes, the illustrated embodiment of the present invention will be described as a by-pass lubricating oil filtration system for an internal combustion engine of a motor vehicle; however, one skilled in the relevant art will appreciate that the disclosed fluid filtration system has wide application and is not to be construed as limited to application with a motor vehicle nor solely with lubricating oil.

Referring to FIG. 1, the elements of the fluid filtration system 10 will now be described. The fluid filtration system 10 includes a mounting plate 12 and a housing or canister 14. The mounting plate 12 is a circular shaped, generally solid body having a thickness. Disposed on the mounting plate 12 is an inlet fitting 16 and an outlet fitting 18. As shown best in FIG. 2, the inlet and outlet fittings 16 and 18 are comprised of internally threaded, perpendicularly oriented bores that extend partially through the thickness of the mounting plate 12. The outlet fitting 18 is located at the center of the circular shaped mounting plate 12 and the inlet fitting 16 is located along a radius that extends outwardly from the center of the circular shaped mounting plate 12. The inlet fitting 16 permits the coupling of the mounting plate 12 in fluid flow communication with the high pressure side of the engine's lubricating system, thereby allowing lubricating oil requiring filtering to be introduced into the fluid filtration system 10. Similarly, the outlet fitting 18 permits the coupling of the mounting plate 12 in fluid flow communication with the engine, thereby allowing filtered oil to return to the low pressure side of the engine's lubricating system. Preferably, the outlet fitting 18 is coupled in fluid flow communication with the location in the engine's lubricating system having the lowest pressure, such as the oil sump, to provide a maximum pressure differential between the inlet and outlet fittings 16 and 18 and thereby across a filter media 46 housed in the canister 14 in the manner described below.

Figure 3:
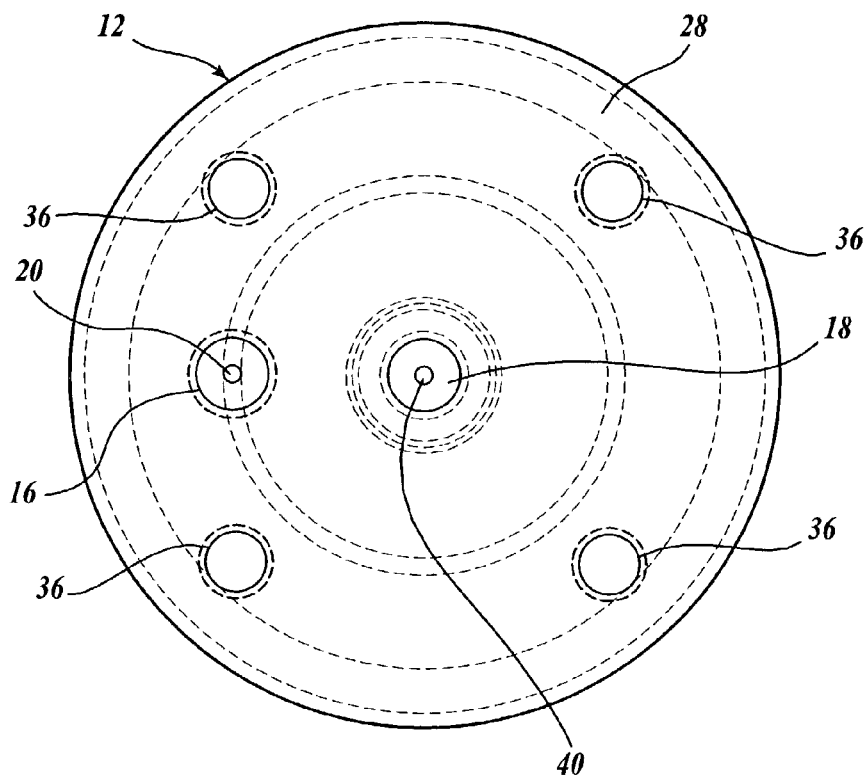
FIG. 3 is a planar view of the end that faces the canister of one embodiment of a mounting plate formed in accordance with the present invention and suitable for use with the fluid filtration system depicted in FIG. 1.
Figure 4:
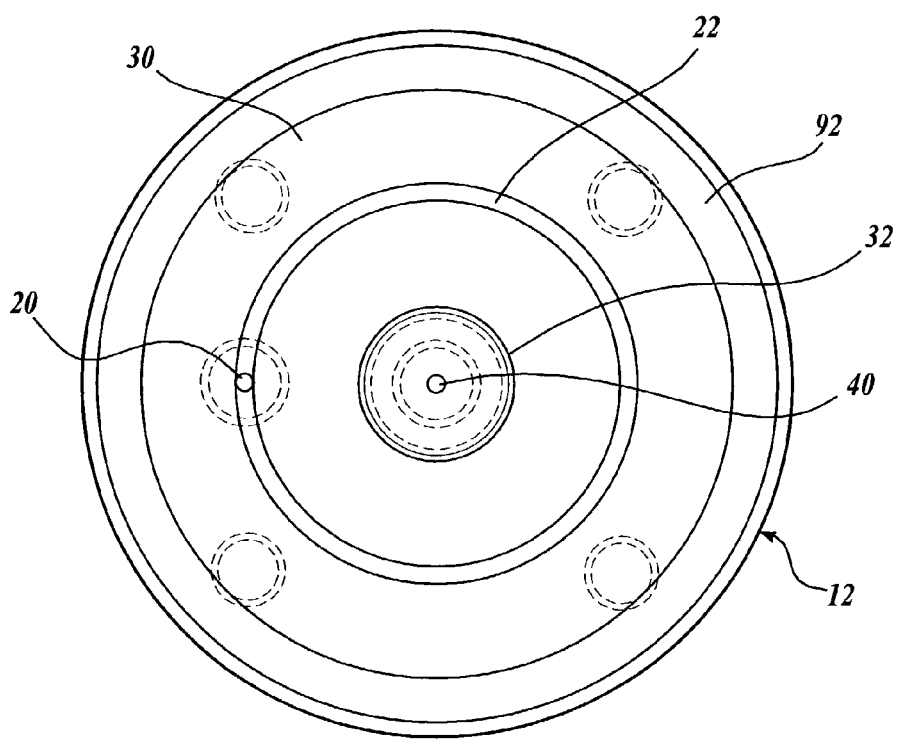
FIG. 4 is a planar view of the end which faces away from the canister of the embodiment of the mounting plate depicted in FIG. 3.

Referring now to FIGS. 2-4, the inlet fitting 16, which is located on an outer end surface 28 of the mounting plate 12, is in fluid flow communication with an inlet fluid passageway 20. The inlet fluid passageway 20 is concentrically located within the bore of the inlet fitting 16 and passes through the thickness of the mounting plate 12, terminating in an annular groove 22 machined on the opposite (inner) end surface 30 of the mounting plate 12. The annular groove 22 is concentrically oriented with respect to the center of the mounting plate 12. The inlet fluid passageway 20 has a diameter substantially less than the diameter of the inlet fitting 16, the significance of which will be described in further detail below.

Still referring to FIGS. 2-4, the outlet fitting 18 is in fluid flow communication with an outlet fluid passageway 24, which is concentrically located within the bore of the outlet fitting 18. The outlet fluid passageway 24 is in fluid flow communication with the outlet fitting 18 and a second outlet fluid passageway 40 that is bored through the center of an externally threaded fastener 32. The second outlet fluid passageway 40 is in fluid flow communication with a third outlet fluid passageway 42, perpendicularly bored through a base 78. Therefore, any fluid contained in the central tube 50 may be transferred to the outlet fitting 18 by passing through the aligned outlet fluid passageways 42, 40 and 24 formed in the base 78, externally threaded fastener 32, and mounting plate 12, respectively. As with the inlet fluid passageway 20, the outlet fluid passageways 24, 40 and 42 have a diameter substantially less than the diameter of the outlet fitting 18, the significance of which will be described in further detail below.

The externally threaded fastener 32 mentioned above extends perpendicularly outward from the center of the inner end surface 30 of the mounting plate 12. The externally threaded fastener 32 has a threaded portion that is sized and dimensioned to correspondingly couple with an internally threaded fastener 34 centrally located in the base 78 that encloses an open end 38 of the canister 14 in the manner described below. The outlet fluid passageway 40 is perpendicularly bored through the center of the externally threaded fastener 32.

Referring now to FIGS. 1-4, the mounting plate 12 also includes four mounting holes 36. The mounting holes 36 are bored perpendicularly into the thickness of the mounting plate 12 from the outer end surface 28. The mounting holes 36 are internally threaded to allow the outer end surface 28 of the mounting plate 12 to be coupled by well known threaded fasteners (not shown) to a mounting bracket (not shown), which in turn is typically attached to the engine or frame of the vehicle, as is well known in the art.

Preferably, the mounting plate 12 also includes a seal 90. The seal 90 is circular in shape and is mounted within an annular seal mounting groove 92 formed in the inner end surface 30 of the mounting plate 12. The annular seal mounting groove 92 is concentrically located in the inner end surface 30, outside of the annular groove 22, i.e., the diameter of the annular seal mounting groove 92 is substantially greater than the annular groove 22. When the mounting plate 12 is coupled to the base 78 of the canister 14 in the manner herein described, the seal 90 is compressed between the inner end surface 30 of the mounting plate 12 and the base 78, thereby sealing the mounting plate 12 to the base 78. The seal 90 aids in impeding the pressurized oil contained within the annular groove 22 from escaping to the environment. Although the illustrated embodiment depicts a rectangular type of seal (cross-section), it should be apparent to one skilled in the art that the present invention may also be practiced without such a seal, or alternately with other types of seals, such as O-ring seals or flat gaskets.

In one actual embodiment of the present invention, the mounting plate 12 is formed from aluminum and the threaded fastener 32 from steel. However, it should be apparent to one skilled in the art that other materials may be used and fall within the scope of the invention.

Referring to FIGS. 1 and 2, the elements of the canister 14 will now be discussed. The canister 14 includes a hollow housing 44 containing filter media 46. The hollow housing 44 is cylindrical in shape, having opposing open ends closed by an integral top 84 and a base 78. The integral top 84 is concave, when viewed from inside of the canister 14. The shape and thickness are sufficient to contain the pressure produced within the canister 14. The concave shape allows the canister 14 to be formed with less material, creating a canister 14 that is light and less expensive to manufacture, while still retaining its ability to adequately withstand the pressures exerted against its inner surface.

Similarly, the base 78 is convex in shape, when viewed from inside of the canister 14. The shape and thickness are adequate to contain the pressure produced within the canister 14. The convex shape allows the canister to be formed with less material, creating a canister that is light and less expensive to manufacture, while still retaining its ability to withstand the pressures exerted against its inner surface. Preferably, the canister housing 44 and the base 78 are formed of iron and are joined together along the outer periphery of the base 78 by welding or press fitting the parts together.

The base 78 has an inlet fluid passageway 72 bored perpendicularly through its thickness. The inlet fluid passageway 72 is positioned radially outward from the center of the base 78 so as to be in alignment with the annular groove 22 in the mounting plate 12. With the inlet fluid passageway 72 positioned as described, the inlet fluid passageway 72 will always be in fluid flow communication with the annular groove 22, regardless of the relative rotational position of the mounting plate 12 with respect to the end plate 78 of the canister 14.

The base 78 further includes a centrally located, internally threaded fastener 34, sized to receive the externally threaded fastener 32. The internally threaded fastener 34 extends perpendicularly inward from the inner end surface 30 of the base 78. The outer diameter of the threaded fastener 34 is sized to slidably fit with the inside wall of the central tube 50, thereby allowing the threaded fastener 34 to be received within the central tube 50. An annular channel 80 is circumferentially disposed on the outer surface of the threaded fastener 34. The annular channel 80 is sized and dimensioned to receive an O-ring 82. The O-ring 82 sealingly engages the inner surface of the central tube 50, thereby impeding the passage of oil between the threaded fastener 34 and the central tube 50. The outlet fluid passageway 42 extends through the center of the fastener 34, thereby completing a passageway between the outlet fitting 18 and the central tube 50.

Housed within the canister 14 is the filter media 46. The filter media 46 is wound around a tubular core 48, which may be constructed from a rigid material, such as cardboard. Concentrically located within the tubular core 48 is the central tube 50, which is constructed from a rigid material, such as steel. The outer diameter of the central tube 50 is substantially equal to the inner diameter of the tubular core 48, whereby the outer surface of the central tube 50 substantially sealingly engages the inner surface of the tubular core 48.

The central tube 50 has a flared end 52. The flaring restrains a flat washer 54 mounted on the central tube 50. The flat washer 54 engages a flat seal 56 and acts as a rigid backing member. In an assembled configuration, the force exerted by a coil spring 86 presses the flat washer 54 against the flat seal 56. The flat seal 56 is thereby pressed against the edges of successive adjacent inner layers of the filter media 46 and the circular end surface of the tubular core 48 to impede channeling between the central tube 50, the filter media tabular core 48, and the filter media 46, as described in more detail below. As shown in FIG. 2, preferably the end of the filter media adjacent to the flat seal 56 tapers away from the center of the flat seal. Although the illustrated embodiment utilizes the force provided by the coil spring 86 to compress the flat seal 56 and provide axial compressive forces upon the filter media, it should be apparent to one skilled in the art that other methods of compressing the flat seal 56 against the filter media 46 can be used and fall within the scope of the invention.

The filter media 46 is formed from any suitable filter material well known in the art, such as cotton-based low porosity paper impregnated with cellulose. The filter media 46 is tightly wound around the tubular core 48, and a sufficient amount of filter media is wound so the outer surface of the filter media engages the inside wall 70 of the housing 44 of the canister 14. Further, as is apparent from viewing FIG. 2, the width of the outer layers gradually increases (as compared to the inner layers) from a first width to a second width as the layers approach the canister wall, to form a convex first end having an annular ring 64 with a tapered wall 66 at the end of the filter media 46 that faces the base 78. In operation, the oil pressure within an inlet cavity 68 creates a force that presses the tapered wall 66 against the inside wall 70 of the housing 44 of the canister 14, thereby impeding channeling along the inside wall 70, as described in more detail below.

More specifically and in regard to the variable width of the filter media, the width of the filter media decreases from a first width measured in proximity to the core to a second width, and increases from the second width to a third width greater than the first width, the third width measured in proximity to the cylindrical outer surface and the second width measured between the points at which the first and third widths are measured. By varying the width as described, the convex first end is formed, along with an opposite concave second end. Although the illustrated convex first end and concave second end are shown as formed in specific shapes, it should be apparent to those skilled in the art that other shapes are suitable for use with and are within the spirit and scope of the present invention. Further, it should be apparent to those skilled in the art, that the terms concave and convex as used within this detailed description, include convex and concave ends formed in a linear manner, arcuate manner, or combination thereof.

An optional well-known wire mesh 88 is also shown in FIG. 2. The wire mesh 88 is formed to have a shape similar to the integral top 84 of the canister 14. The wire mesh 88 is sandwiched between the coil spring 86 and the top 84 of the canister 14. As will be apparent to one skilled in the art, the wire mesh 88 may be used in instances where the filter media 46 is wound or placed in the canister 14 in such a manner that the filter media 46 engages the integral top 84, thereby impeding the discharge of oil from the filter media 46. In such instances, the wire mesh 88 will space the filter media 46 from the integral top 84, by an amount sufficient to provide flow paths for oil to exit the filter media 46 and enter the central tube 50.

The operation of the illustrated embodiment of the present invention will now be described. Referring to FIG. 2, the inlet fitting 16 is coupled in fluid flow communication with the pressurized side of the engine lubricating system by any suitable conduit means well known in the art. Likewise, the outlet fitting 18 is coupled in fluid flow communication via another suitable conduit with the low pressure side of the engine lubricating system, and preferably to the oil sump. Oil to be filtered is delivered through the inlet line to the inlet fitting 16. From the inlet fitting 16 the oil passes through the inlet fluid passageway 20 and into the annular groove 22. The oil passes along the annular groove 22 until it reaches the inlet fluid passageway 72, where it enters the canister 14. Once in the canister 14, the oil begins its tortuous travel through the filter media 46 in the direction of the arrow indicated by the reference numeral 74. As the oil passes through the filter media 46, particulates bind with the filter media and are removed from the oil by methods well known in the art.

After the oil has traveled the entire length of the filter media 46, the oil enters an end cavity 75. From the end cavity 75, the oil enters the central tube 50, flowing in the direction of the arrow indicated by reference numeral 76. The oil leaves the canister 14 via the outlet fluid passageways 24, 40 and 42 to the outlet fitting 18, which returns the filtered oil to the low pressure side of the engine lubricating system.

Once the expected useful life of the filter media 46 has been reached, the canister 14 is simply rotated until the internally threaded fastener 34 of the canister 14 is disengaged from the externally threaded fastener 32 of the mounting plate 12. As discussed above, the inlet fluid passageway 72 and the outlet fluid passageways 24, 40 and 42 each have a diameter substantially less than the inner diameter of the inlet and outlet fittings 16 and 18, respectively. The small diameter of the inlet fluid passageway 72 and the outlet fluid passageways 24, 40 and 42 reduces, if not entirely eliminates, the spillage of oil during removal of the canister 14.

Preferably, the diameters of the inlet fluid passageway 72 and the outlet fluid passageways 24, 40 and 42 are one-tenth (0.1) of an inch or less. In one actual embodiment of the present invention, the diameters of the inlet fluid passageway 72 and the outlet fluid passageways 24, 40 and 42 are 50 thousandths (0.05) of an inch. The diameters of the inlet fluid passageway 72 and the outlet fluid passageways 24, 40 and 42 are preferably selected so forces well known in the field of fluid mechanics, such as friction and surface tension effects created by the interaction of the fluid with the exposed surfaces of the inlet fluid passageway 72 or outlet fluid passageways 24, 40 and 42, are sufficient to overcome the forces, such as gravity, tending to force the oil out through the inlet fluid passageway 72 and outlet fluid passageways 24, 40 and 42 when the oil is at atmospheric pressure and below selected temperature, such a normal operating temperature or room temperature. When appropriate diameters are chosen, a substantial majority of the oil remains within the canister 14 during removal of the canister 14 from the mounting plate 12.

It is well known to those skilled in the art that the fluid mechanical properties of a fluid vary between fluids, and also vary for the same fluid based on changes in other variables, such as temperature. Therefore, the maximum size of fluid passageways, which substantially eliminate discharge, is dependent on the individual properties of a specific fluid and upon various variables defining the fluid, such as temperature. For example, the maximum fluid passageway size that will still substantially eliminate flow from the canister 14 will be significantly smaller for heated oil as relative to the same oil at a lower temperature, and likewise significantly smaller for water as compared to a viscous lubricating oil of an equal temperature. Therefore, although preferred diameters are disclosed for one embodiment of the present invention, it is to be understood that other diameters fall within the scope of the present invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A fluid filtration canister for removing contaminants from a machine fluid, the fluid filtration canister comprising:
   (a) a hollow housing having an open end and a closed end;
   (b) filter media disposed within the housing, wherein the filter media is wound around a core disposed within the housing to form a roll having a cylindrical outer surface and a first end formed by successive adjacent edges of the wound filter media, wherein the first end is convex in shape when viewed from the center of the roll; and
   (c) a base, coupled to the open end of the housing so as to close off the open end of the hollow housing for removably attaching the fluid filtration canister to a machine, the base including:
      (i) an inlet for receiving fluid from the machine;
      (ii) an inlet fluid passageway in fluid communication with the inlet and the filter media, at least a portion of the inlet fluid passageway being sized sufficiently small in cross-sectional area to substantially eliminate the flow of fluid due to gravity out of the housing during removal of the fluid filtration canister from the machine when the fluid is at atmospheric pressure and below a predetermined temperature;

(iii) an outlet for delivering filtered fluid to the machine; and (iv) an outlet fluid passageway in fluid communication with the outlet and the filter media, at least a port of the outlet fluid passageway also being sized sufficiently small in cross-sectional area to substantially eliminate the flow of fluid due to gravity out of the housing during removal of the fluid filtration canister from the machine when the fluid is at atmospheric pressure and below a predetermined temperature.

2. The fluid filtration canister of claim 1, wherein the base is convex in shape when viewed from within the housing and wherein the closed end of the housing is concave in shape when viewed from within the housing.

3. The fluid filtration canister of claim 1, wherein the diameter of the portion of the inlet fluid passageway is about 0.1 of an inch or less.

4. The fluid filtration canister of claim 1, wherein the diameter of the portion of the inlet fluid passageway is about 0.05 of an inch or less.

5. The fluid filtration canister of claim 1, wherein the base is substantially planar from the center of the base outward to a first diameter, and arcuate from the first diameter to a second greater diameter to form a convex shape.

6. The fluid filtration canister of claim 1, wherein the diameter of the portion of the inlet and outlet fluid passageways is about 0.1 of an inch or less.

7. The fluid filtration canister of claim 1, wherein the diameter of the portion of the inlet and outlet fluid passageways is about 0.05 of an inch or less.

8. The fluid filtration canister of claim 1, wherein the diameter of the portion of the outlet fluid passageway is about 0.1 of an inch or less.

9. The fluid filtration canister of claim 1, wherein the diameter of the portion of the outlet fluid passageway is about 0.05 of an inch or less.

10. A fluid filtration canister for removing contaminants from a machine fluid, the fluid filtration canister comprising:
    (a) a hollow housing having an open end and a closed end;
    (b) filter media disposed within the housing;
    (c) a core disposed within the housing;
    (d) a roll formed by winding the filter media around the core, the roll having a cylindrical outer surface and a first end formed by successive adjacent edges of the wound filter media;
    (e) a seal adapted to impede channeling of the fluid in proximity to the core through substantially sealing annuluses formed between adjacent wraps of filter media by engaging the edges of adjacent wraps of the filter media in proximity to the core without substantially radially displacing the adjacent wraps of filter media; and
    (f) a base, coupled to the open end of the housing so as to close off the open end of the hollow housing for removably attaching the fluid filtration canister to a machine, the base including:
        (i) an inlet for receiving fluid from the machine;
        (ii) an inlet fluid passageway in fluid communication with the inlet and the filter media, at least a portion of the inlet fluid passageway being sized sufficiently small in cross-sectional area to substantially eliminate the flow of fluid due to gravity out of the housing during removal of the fluid filtration canister from the machine when the fluid is at atmospheric pressure and below a predetermined temperature;
        (iii) an outlet for delivering filtered fluid to the machine; and
        (iv) an outlet fluid passageway in fluid communication with the outlet and the filter media, at least a portion of the outlet fluid passageway also being sized sufficiently small in cross-sectional area to substantially eliminate the flow of fluid due to gravity out of the housing during removal of the fluid filtration canister from the machine when the fluid is at atmospheric pressure and below a predetermined temperature.

11. A removable filter cartridge for removing contaminants from a fluid, the filter cartridge comprising:
    (a) a core disposed along a longitudinal axis;
    (b) a length of filter media wound around the core to form a roll having a cylindrical outer surface and a first end formed by successive adjacent edges of the wound filter media, wherein the first end is substantially planar from the core outward to a first diameter, and arcuate from the first diameter outward to the cylindrical outer surface to form a convex shape; and
    (c) a housing enclosing the core and the filter media, the housing including a base having:
        (i) an inlet fluid passageway in fluid communication with the filter media, at least a portion of the inlet fluid passageway being sized sufficiently small in cross-sectional area to substantially eliminate the flow of fluid due to gravity out of the housing when the removable fluid cartridge is being removed and the fluid is at atmospheric pressure and below a selected temperature; and
        (ii) an outlet fluid passageway in fluid communication with the filter media, at least a portion of the outlet fluid passageway being sized sufficiently small in cross-sectional area to substantially eliminate the flow of fluid due to gravity out of the housing when the removable fluid cartridge is being removed and the fluid is at atmospheric pressure and below a selected temperature.

12. The filter cartridge of claim 11, wherein the diameter of the portion of the inlet fluid passageway is 0.1 of an inch or less.

13. The filter cartridge of claim 11, further comprising a seal adapted to impede channeling of a fluid in proximity to the core through substantially sealing annuluses formed between adjacent wraps of filter media by engaging the edges of adjacent wraps of the filter media in proximity to the core without substantially radially displacing the adjacent wraps of filter media.

14. The fluid filtration cartridge of claim 11, wherein the diameter of the portion of the inlet fluid passageway is about 0.05 of an inch or less.

15. The fluid filtration cartridge of claim 11, wherein the diameter of the portion of the inlet and outlet fluid passageways is about 0.05 of an inch or less.

16. The fluid filtration cartridge of claim 11, wherein the diameter of the portion of the outlet fluid passageway is about 0.1 of an inch or less.

17. The fluid filtration cartridge of claim 11, wherein the diameter of the portion of the outlet fluid passageway is about 0.05 of an inch or less.

18. A removable filter cartridge for removing contaminants from a fluid, the filter cartridge comprising:
    (a) a core disposed along a longitudinal axis;
    (b) a length of filter media wound around the core to form a roll having a cylindrical outer surface and a first end formed by successive adjacent edges of the wound filter media, wherein the filter media has a variable width that increases from a first width to a second greater width; and (c) a housing enclosing the core and the filter media, the housing including a base having:
  (i) an inlet fluid passageway in fluid communication with the filter media, at least a portion of the inlet fluid passageway being sized sufficiently small in cross-sectional area to substantially eliminate the flow of fluid due to gravity out of the housing when the removable fluid cartridge is being removed and the fluid is at atmospheric pressure and below a selected temperature; and
  (ii) an outlet fluid passageway in fluid communication with the filter media, at least a portion of the outlet fluid passageway being sized sufficiently small in cross-sectional area to substantially eliminate the flow of fluid due to gravity out of the housing when the removable fluid cartridge is being removed and the fluid is at atmospheric pressure and below a selected temperature.

19. The filter cartridge of claim 18, wherein the first width is in proximity to the core and the second greater width is in proximity to the cylindrical outer surface.

20. A removable filter cartridge for removing contaminants from a fluid, the filter cartridge comprising:
(a) a core disposed along a longitudinal axis;
(b) a length of filter media wound around the core to form a roll having a cylindrical outer surface and a first end formed by successive adjacent edges of the wound filter media, wherein the filter media has a variable width which:
  (i) decreases from a first width measured in proximity to the core to a second width; and
  (ii) increases from the second width to a third width greater than the first width, the third width measured in proximity to the cylindrical outer surface and the second width measured between the points at which the first and third widths are measured; and
(c) a housing enclosing the core and the filter media, the housing including a base having:
  (i) an inlet fluid passageway in fluid communication with the filter media, at least a portion of the inlet fluid passageway being sized sufficiently small in cross-sectional area to substantially eliminate the flow of fluid due to gravity out of the housing when the removable fluid cartridge is being removed and the fluid is at atmospheric pressure and below a selected temperature; and
  (ii) an outlet fluid passageway in fluid communication with the filter media, at least a portion of the outlet fluid passageway being sized sufficiently small in cross-sectional area to substantially eliminate the flow of fluid due to gravity out of the housing when the removable fluid cartridge is being removed and the fluid is at atmospheric pressure and below a selected temperature.

21. A removable filter cartridge for removing contaminants from a fluid, the filter cartridge comprising:
(a) a core disposed along a longitudinal axis;
(b) a length of filter media wound around the core to form a roll having a cylindrical outer surface and a first end formed by successive adjacent edges of the wound filter media; and a second end located opposite the first end, the second end formed by successive adjacent edges of the wound filter media, wherein the second end is concave in shape when viewed from the center of the roll; and
(c) a housing enclosing the core and the filter media, the housing including a base having:
  (i) an inlet fluid passageway in fluid communication with the filter media, at least a portion of the inlet fluid passageway being sized sufficiently small in cross-sectional area to substantially eliminate the flow of fluid due to gravity out of the housing when the removable fluid cartridge is being removed and the fluid is at atmospheric pressure and below a selected temperature; and
  (ii) an outlet fluid passageway in fluid communication with the filter media, at least a portion of the outlet fluid passageway being sized sufficiently small in cross-sectional area to substantially eliminate the flow of fluid due to gravity out of the housing when the removable fluid cartridge is being removed and the fluid is at atmospheric pressure and below a selected temperature.

22. The filter cartridge of claim 21, wherein the second end extends further outward in a longitudinal direction in proximity to the core than in proximity to the cylindrical outer surface.

23. The filter cartridge of claim 21, wherein the first end extends further outward in a longitudinal direction in proximity to the cylindrical outer surface than in proximity to the core.

24. The filter cartridge of claim 21, wherein the first end includes an annular ring formed from the filter media and located adjacent to the cylindrical outer surface.

25. The filter cartridge of claim 24, wherein the annular ring tapers in width from a broad base to a narrow top as the annular ring extends longitudinally outward.

26. A fluid filtration canister for removing contaminants from a machine fluid, the fluid filtration canister comprising:
(a) a housing including a base suitable for removably attaching the fluid filtration canister to a machine;
(b) filter media disposed within the housing, wherein the filter media is wound around a core disposed within the housing to form a roll having a cylindrical outer surface and a first end formed by successive adjacent edges of the wound filter media, wherein the first end is convex in shape when viewed from the center of the roll;
(c) an inlet fluid passageway in the base of said housing for receiving fluid from the machine, the inlet fluid passageway in fluid communication with the filter media, at least a portion of the inlet fluid passageway sized sufficiently small in cross-sectional area to substantially eliminate the flow of fluid due to gravity out of the housing during removal of the fluid filtration canister from the machine; and
(d) an outlet fluid passageway in the base of said housing for delivering filtered fluid to the machine, the outlet fluid passageway in fluid communication with the filter media, at least a portion of the outlet fluid passageway sized sufficiently small in cross section to substantially eliminate the flow of fluid due to gravity out of the housing during removal of the fluid filtration canister from the machine.

27. The fluid filtration canister of claim 26, wherein the portion of the inlet fluid passageway is sized sufficiently small in cross-sectional area to substantially eliminate the flow of fluid due to gravity out of the housing when the fluid is at atmospheric pressure and below a selected temperature.

28. The fluid filtration canister of claim 27, wherein the selected temperature is the normal operating temperature of the machine.

29. The fluid filtration canister of claim 27, wherein the selected temperature is room temperature.

30. The fluid filtration canister of claim 26, wherein the diameter of the portions of the inlet and outlet fluid passageways is about 0.1 of an inch or less.

31. The fluid filtration canister of claim 26, wherein the diameter of the portions of the inlet and outlet fluid passageways is about 0.05 of an inch or less.

32. The fluid filtration canister of claim 26, wherein the diameter of the portions of the inlet and outlet fluid passageways is about 0.1 of an inch or less.

33. The fluid filtration canister of claim 26, wherein the diameter of the portions of the inlet and outlet fluid passageways is about 0.05 of an inch or less.

34. The fluid filtration cartridge of claim 26, wherein the diameter of the portion of the inlet fluid passageway is about 0.1 of an inch or less.

35. The fluid filtration canister of claim 26, wherein the diameter of the portion of the inlet fluid passageway is about 0.05 of an inch or less.

36. The fluid filtration cartridge of claim 26, wherein the diameter of the portion of the outlet fluid passageway is about 0.1 of an inch or less.

37. The fluid filtration canister of claim 26, wherein the diameter of the portion of the outlet fluid passageway is about 0.05 of an inch or less.

38. A fluid filtration canister for removing contaminants from a machine fluid, the fluid filtration canister comprising:
   (a) a housing including a base suitable for removably attaching the fluid filtration canister to a machine;
   (b) filter media disposed within the housing;
   (c) a core disposed within the housing;
   (d) a roll formed by winding the filter media around the core, the roll having a cylindrical outer surface and a first end formed by successive adjacent edges of the wound filter media;
   (e) a seal adapted to impede channeling of the fluid in proximity to the core through substantially sealing annuluses formed between adjacent wraps of filter media by engaging the edges of adjacent wraps of the filter media in proximity to the core without radially displacing the adjacent wraps of filter media;
   (f) an inlet fluid passageway in the base of said housing for receiving fluid from the machine, the inlet fluid passageway in fluid communication with the filter media, at least a portion of the inlet fluid passageway sized sufficiently small in cross-sectional area to substantially eliminate the flow of fluid due to gravity out of the housing during removal of the fluid filtration canister from the machine; and
   (g) an outlet fluid passageway in the base of said housing for delivering filtered fluid to the machine, the outlet fluid passageway in fluid communication with the filter media, at least a portion of the outlet fluid passageway sized sufficiently small in cross section to substantially eliminate the flow of fluid due to gravity out of the housing during removal of the fluid filtration canister from the machine.

39. A removable fluid filtration canister for removing contaminants from a machine fluid, the fluid filtration canister comprising:
   (a) a housing including a base;
   (b) a core disposed within the housing;
   (c) a length of filter media wound around the core to form a roll having a cylindrical outer surface and a first end formed by successive adjacent edges of the wound filter media;
   (d) a seal adapted to impede channeling of the fluid in proximity to the core through substantially sealing annuluses formed between adjacent wraps of filter media by engaging the edges of adjacent wraps of the filter media in proximity to the core without substantially radially displacing the adjacent wraps of filter media;
   (e) an inlet fluid passageway in the base of said housing, the inlet fluid passageway in fluid communication with the filter media, at least a portion of the inlet fluid passageway being sized sufficiently small in cross-sectional area to substantially eliminate the flow of fluid due to gravity out of the housing when the removable fluid filtration canister is being removed and the fluid is at atmospheric pressure and below a selected temperature; and
   (f) an outlet fluid passageway in the base of said housing, the outlet fluid passageway in fluid communication with the filter media, at least a portion of the outlet fluid passageway being sized sufficiently small in cross section to substantially eliminate the flow of fluid due to gravity out of the housing when the removable fluid filtration canister is being removed and the fluid is at atmospheric pressure and below a selected temperature.

40. The fluid filtration canister of claim 39, further comprising a biasing device for biasing the seal axially upon the successive adjacent edges of the filter media so as to apply axial compressive forces upon the filter media in proximity to the core.

41. The fluid filtration canister of claim 40, wherein the biasing device is a spring.

42. The fluid filtration canister of claim 39, wherein the seal does not protrude into the roll.

43. The fluid filtration canister of claim 39, wherein the core is hollow and the seal does not substantially extend within the hollow portion of the core.

44. The fluid filtration canister of claim 39, wherein the seal is disc shaped.

45. The fluid filtration canister of claim 39, further comprising a rigid backing member, the rigid backing member placed in engagement with the seal to provide support to the seal.

46. The fluid filtration canister of claim 39, wherein the first end is convex in shape when viewed from the center of the roll.

47. The fluid filtration canister of claim 39, wherein the diameter of the portion of the inlet fluid passageway is 0.1 of an inch or less.

48. The fluid filtration canister of claim 39, wherein the diameter of the portion of the inlet fluid passageway is about 0.05 of an inch or less.

49. The fluid filtration canister of claim 39, wherein the diameter of the portions of the inlet and outlet fluid passageways is about 0.1 of an inch or less.

50. The fluid filtration canister of claim 39, wherein the diameter of the portions of the inlet and outlet fluid passageways is about 0.05 of an inch or less.

51. The fluid filtration canister of claim 39, wherein the diameter of the portion of the outlet fluid passageway is about 0.1 of an inch or less.

52. The fluid filtration canister of claim 39, wherein the diameter of the portion of the outlet fluid passageway is about 0.05 of an inch or less.

* * * * *